(12) United States Patent
Karakoyunlu

(10) Patent No.: US 12,688,311 B2
(45) Date of Patent: Jul. 21, 2026

(54) HARDWARE SPECIFIC CRYPTOGRAPHIC KEY

(71) Applicant: Analog Devices, Inc., Wilmington, MA (US)

(72) Inventor: Deniz Karakoyunlu, Newton, MA (US)

(73) Assignee: Analog Devices, Inc., Wilmington, MA (US)

(*) Notice: Subject to any disclaimer, the term of this patent is extended or adjusted under 35 U.S.C. 154(b) by 74 days.

(21) Appl. No.: 18/744,428

(22) Filed: Jun. 14, 2024

(65) Prior Publication Data

US 2025/0384147 A1 Dec. 18, 2025

(51) Int. Cl.
G06F 21/60 (2013.01)
G06F 21/57 (2013.01)

(52) U.S. Cl.
CPC .......... G06F 21/602 (2013.01); G06F 21/572 (2013.01); G06F 21/575 (2013.01); G06F 2221/2107 (2013.01)

(58) Field of Classification Search
CPC ...... G06F 21/44; G06F 21/602; G06F 21/572; G06F 21/575; G06F 2221/2107; G06F 8/60; G06F 8/61; G06F 8/63
See application file for complete search history.

(56) References Cited

U.S. PATENT DOCUMENTS

| | | | | |
|---|---|---|---|---|
| 8,661,552 B2 * | 2/2014 | Alkove | ................... | G06F 21/10 |
| | | | | 713/193 |
| 12,212,665 B1 * | 1/2025 | Lazutkin | ............ | G06Q 20/3823 |
| 12,248,579 B1 * | 3/2025 | Newman | .................... | G06F 8/65 |
| 2008/0076355 A1 * | 3/2008 | Waltermann | .......... | G06F 21/575 |
| | | | | 455/260 |
| 2016/0012233 A1 * | 1/2016 | Kawano | ................ | G06F 21/575 |
| | | | | 713/165 |
| 2016/0164678 A1 * | 6/2016 | Nix | ........................ | H04L 9/0841 |
| | | | | 380/270 |
| 2018/0157840 A1 * | 6/2018 | Crowley | ................. | G06F 21/57 |
| 2019/0163912 A1 * | 5/2019 | Kumar | .................. | H04L 9/0825 |
| 2019/0220611 A1 * | 7/2019 | Nix | ........................ | H04W 12/04 |

(Continued)

OTHER PUBLICATIONS

S. Falas, C. Konstantinou and M. K. Michael, "A Hardware-based Framework for Secure Firmware Updates on Embedded Systems," 2019 IFIP/IEEE 27th International Conference on Very Large Scale Integration (VLSI-SoC), Cuzco, Peru, 2019, pp. 198-203, doi: 10.1109/VLSI-SoC.2019.8920348. (Year: 2019).*

(Continued)

*Primary Examiner* — Michael Simitoski
(74) *Attorney, Agent, or Firm* — Schwegman Lundberg & Woessner, P.A.

(57) ABSTRACT

System and techniques to generate a cryptographic key specific to a type of hardware are described herein. Software distribution and execution can use cryptographic keys tailored to specific hardware. A secret is generated from a hardware public key. The secret is used to create software public and private keys. The secret is used to protect the data and the public key is distributed with the software for use on a class of hardware to which the hardware private key is applicable. The hardware then uses the software public key and a local copy of the hardware private key to find the secret and decrypt the software to run the software locally.

20 Claims, 5 Drawing Sheets

(56) References Cited

U.S. PATENT DOCUMENTS

| | | | | |
|---|---|---|---|---|
| 2020/0162247 | A1* | 5/2020 | Nix | H04L 9/0841 |
| 2020/0274699 | A1* | 8/2020 | Watson | H04L 9/3249 |
| 2020/0382294 | A1* | 12/2020 | Pilozzi | H04L 9/0897 |
| 2021/0192012 | A1* | 6/2021 | Ohashi | H04L 9/0841 |
| 2022/0191178 | A1* | 6/2022 | Fang | H04L 9/085 |
| 2022/0231840 | A1* | 7/2022 | Doherty | H04L 9/0877 |

OTHER PUBLICATIONS

Apple, Inc. "iOS Security", Jan. 2018. (Year: 2018).*
Adi, Wael, et al., "VLSI design exchange with intellectual property protection in FPGA environment using both secret and public-key cryptography", IEEE Computer Society Annual Symposium on Emerging VLSI Technologies and Architectures (ISVLSI'06), (2006), 6 pgs.
Dalpasso, Marcello, et al., "Hardware/Software IP protection", Proceedings of the 37th Annual Design Automation Conference, (2000), 593-596.
Yi, G., et al., "Engineer-to-Engineer Note—EE-366", Analog Devices, Inc., (Oct. 19, 2016), 22 pgs.

* cited by examiner

305 — OBTAIN STATIC SPATIAL IMAGE

310 — SELECT SCAN PATH

315 — SCAN WINDOW ALONG SCAN PATH ON IMAGE

320 — RECORD CHANGES AS SEEN BY WINDOW DURING SCAN ALONG WITH TIMES OF THE CHANGES

325 — RECORD CHANGES AS SEEN BY WINDOW DURING SCAN ALONG WITH TIMES OF THE CHANGES

405 — OBTAIN ENCRYPTED SOFTWARE PACKAGE

410 — RETRIEVE HARDWARE PRIVATE KEY

415 — CALCULATE SECRET BASED ON HARDWARE PRIVATE KEY AND SOFTWARE PUBLIC KEY

420 — DECRYPT AN ENCRYPTED PORTION OF SOFTWARE PACKAGE USING THE SECRET

425 — EXECUTE A PROGRAM USING THE DECRYPTED PORTION OF THE ENCRYPTED SOFTWARE PACKAGE

HARDWARE SPECIFIC CRYPTOGRAPHIC KEY

TECHNICAL FIELD

Embodiments described herein generally relate to cryptographic key creation and more specifically to a hardware specific cryptographic key.

BACKGROUND

Elliptic Curve Diffie-Hellman (ECDH) is a key exchange technique generally used for secure communication over public channels. The technique leverages properties of elliptic curves over finite fields, offering enhanced security and efficiency compared to the original Diffie-Hellman approach. In ECDH, each party generates their own pair of public and private keys based on a shared elliptic curve and a base point that is known to both parties. The strength of ECDH lies in the difficulty of the Elliptic Curve Discrete Logarithm Problem (ECDLP), which posits that finding the discrete logarithm of a random elliptic curve element with respect to a publicly known base point is computationally infeasible. The private key is a randomly chosen integer, while the public key is generated by multiplying the base point by the private key. Secure key exchange is achieved when both parties compute the shared secret by multiplying their private key with the other party's public key. The resulting shared secret, derived independently by both parties using their private keys and each other's public keys, can then be used to encrypt subsequent communications. The efficiency and shorter key lengths used by ECDH, compared to traditional Diffie-Hellman or Rivest-Shamir-Adleman (RSA)-based public-key cryptography systems, make it particularly well-suited for use in environments with constrained resources.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
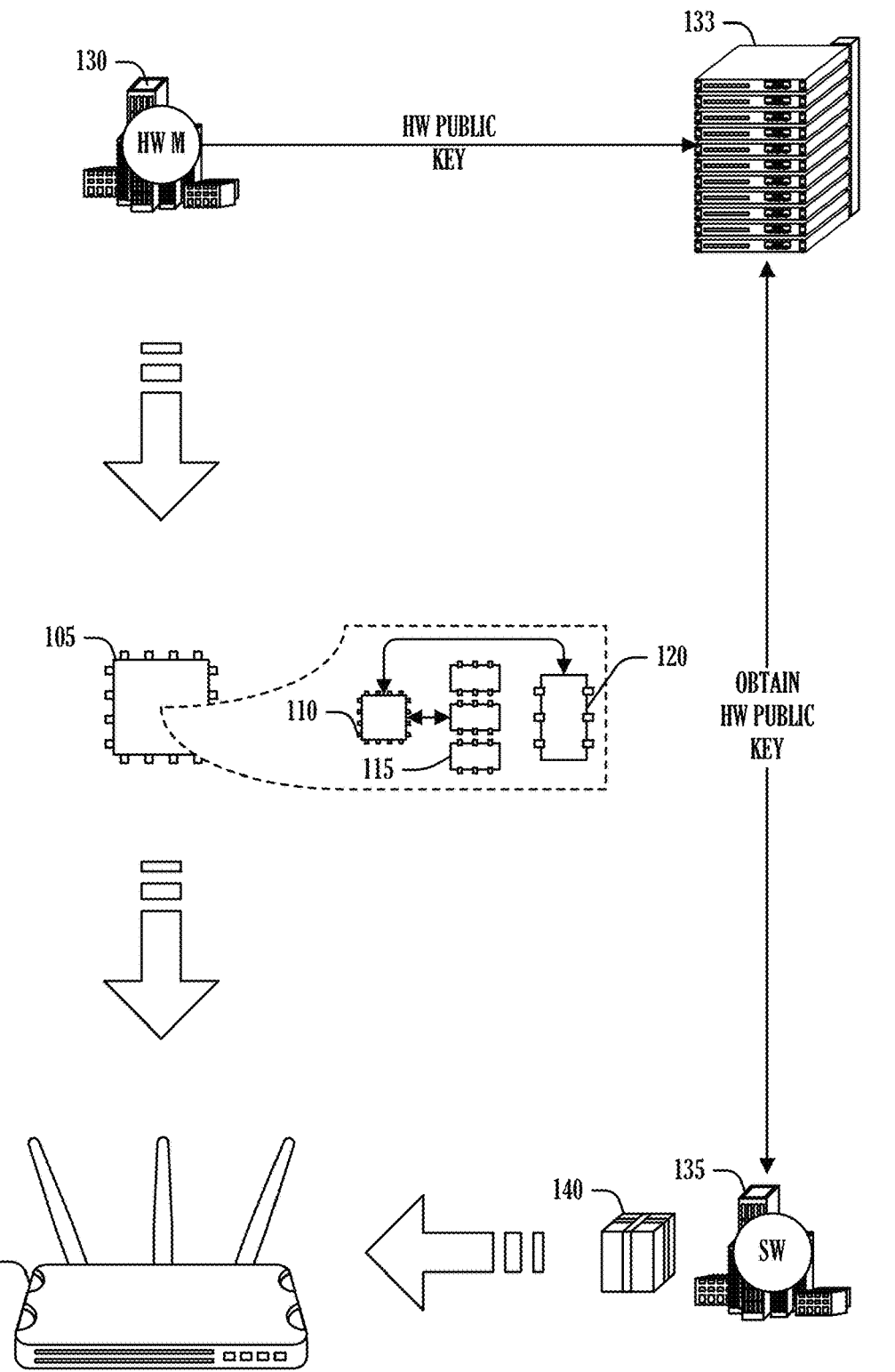
FIG. 1 is a block diagram of an example of an environment including a system for a hardware specific cryptographic key, according to an embodiment.

There are several scenarios in which software or data distributed to run on hardware warrants protection from users or third party interlopers. For example, if a company has a proprietary video encoder, the company may want to protect the encoder from being learned by a customer. Thus, software or data providers need a way to protect their intellectual property when they release their software programs to be executed on multitude of devices. Generally, the protected instructions (e.g., code, routines, software, etc.) should remain confidential at rest (e.g., at a cloud repository), in transit (e.g., being transmitted to a device), and in use (e.g., when resident on the device).

Encryption is typically used to protect software. Symmetric encryption, usually the simplest and most efficient form of encryption, uses a single key to both encrypt and decrypt a package. However, establishing the encryption-decryption key for software protection is a challenging problem. Generally, in this scenario, a single software package is encrypted using the single encryption-decryption key. However, many devices also have the same key to decrypt and run this the software package. Thus, while the key may be kept secure by the software developer, the widespread distribution of the key onto all of the devices increases the likelihood that the key will be exposed, ultimately circumventing the protection of the software. Other techniques, such as RSA public key techniques, often increase the end-pointing computing requirements and infrastructure requirements (e.g., certificate management) to such a degree that many computing platforms, such as sensing devices, robot control systems, etc. cannot use it in many implementations due to power consumption, size, manufacturing complexity, or other costs.

To address the issues of key security in a variety of hardware platforms, Elliptic-Curve Diffie-Hellman (ECDH) key establishment can be used instead of using static and break-one-break-all type of symmetric keys. Here, an Elliptic Curve (EC) key pair is created for the hardware (e.g., for each type of hardware) and an EC key pair is created for the software (e.g., for each protected software release). Using ECDH enables software producers to establish a new encryption key for any software release (e.g., a current release) using a unique EC private key the public key of the hardware. When the device hardware is presented with the public component of the software EC key, the device can establish the encryption-decryption key using the private portion of the hardware EC key that is securely stored in hardware.

This arrangement has several benefits over current techniques. For example, hardware private key that is shared among the hardware devices is used only for key agreement between the hardware and the software. Thus, the hardware private key exposure is limited to the ECDH operation at boot time to generate a software release specific decryption key. Thus, the key remains secure from users of the hardware. The developers of the software do not need the hardware private key for the technique to be successful. Thus, the hardware private key is only known by the manufacturer of the hardware, reducing exposure of the key and thus the likelihood that the hardware private key will be compromised for the hardware devices.

This technique also avoids the need for a shared secret between the hardware manufacturer and the software developer, eliminating a vector by which insecurity at one end may compromise the other. By protecting the hardware private key at product test, and ensuring that the hardware private key is properly secured in the device, it is unlikely that the hardware will be comprised. This enables any failure to protect the private key of a software release to be overcome by generating a new release with a new software public-private key pair. This is an improvement on mechanisms that rely on software developers having access to a secret that is stored in the hardware.

Another emergent benefit includes the ability to separate hardware security from users of the hardware. Because a software developer can freely choose any software key pair, there is no need for users (e.g., purchasers of the hardware and software) to have to access a key management infrastructure of the hardware manufacture, as is often necessary today. Rather, the software developer can produce a unique encryption-decryption key for each software release and customer. When the corresponding software public key is provided with the software (e.g., included in a software package), the hardware can reproduce the encryption-decryption key to run the software. Again, by enabling the software security to be changed (e.g., different) between software releases, users (e.g., customers), or both, any successful attack on the encryption-decryption key is limited to the combination of software release or user for which that encryption-decryption key was used. Importantly, there is no need to change the hardware private key in hardware devices to facilitate this flexible and secure approach. Additional details and examples are provided below.

FIG. 1 is a block diagram of an example of an environment including a system 105 for a hardware specific cryptographic key, according to an embodiment. In an example, the illustrated components can operate in the following manner. The system 105 is hardware produced by a manufacturer 130. Here, the system 105 can be a considered as an instance of computer hardware because it is generally the case that the manufacturer 130 will produce several copies of the system 105 during production. The Manufacturer 130 creates a hardware key pair (e.g., a public key and a corresponding private key) that can be used to create an encryption-decryption key or used directly to encrypt or decrypt. The hardware key pair is specific to a type of hardware, including the system 105, by virtue of the inclusion of the hardware private key being installed on the hardware at production. The hardware public key is made available, such as through a key management system 133, to other entities, such as a software developer 135. The software developer 135 uses the hardware private key to produce a software key-pair. This key pair is used to ultimately encrypt the software into an encrypted software package 140 that includes the software public key. The encrypted software package 140 can then be installed on a device 125 that includes the system 105. At this point, the system 105 can use the software public key of the encrypted software package in conjunction with the hardware private key to decrypt the encrypted software package and run the software on the device 125.

The system 105 includes processing circuitry 110, storage 120 (e.g., power-stable storage such as a hard drive, solid state drive, etc.), and memory 115. The memory 115 is generally used to maintain running state information for the system 105 that is generally discarded between system power cycles or restarts. The memory 115 and the storage 120 are both forms of computer readable media. The processing circuitry 110 or software residing in the memory 115 or storage 120 executing on the processing circuitry 110 configure the system 105 to perform various operations when in operation.

From the perspective of the system 105, to implement the hardware specific cryptographic key during operation, the processing circuitry 110 is configured to obtain the encrypted software package 140. For example, during boot, the processing circuitry 110 can load the encrypted software package from the storage 120 into the memory 115. As noted above, the encrypted software package 140 includes encrypted data (e.g., the software, tables, data structures, etc.) and a software public key. The manner in which the encrypted software package can be included in the system 105, or the device 125, can vary. For example, the manufacturer of the device 125 can install the encrypted software package 140 during manufacture, or the encrypted software package 140 can be downloaded or installed at a later time.

The processing circuitry 110 is configured to retrieve a hardware private key from a secure component of the system 105. Here, the secure component is protected from other processes or interventions (e.g., diagnostic snooping) of the system 105. Such a secure component can be a portion of the memory 115 or storage 120 that enables protected access, or another component of the system such as hardware that conforms to the Trusted Platform Module (TPM) familiar of standards. Generally, the secure portion maintains data held within in an encrypted format. Other techniques, such as single thread execution can be implemented to ensure that only the authorized thread, or process, is operating when the contents of the secure component are exposed (e.g., decrypted and put into the memory 115).

In an example, the retrieval of the hardware private key is based on a trigger. In an example, the trigger is part of a boot sequence for the instance of computer hardware. In an example, the trigger is part of an installation sequence of the encrypted software package on the instance of computer hardware. These examples of triggers illustrate that the hardware private key can be further sequestered until these specific moments, such as during boot, rather than generally being used during processing. Thus, the security of the hardware private key can be increased during these periods and maintained in the secure component at other times.

In an example, the secure component is an encrypted key cache, such as a TPM component. In an example, the processing circuitry 110 is configured to decrypt the hardware private key from boot storage (e.g., in the storage 120) as part of a boot sequence and to load the hardware private key into the encrypted key cache. This makes the hardware private key available during operations to participate in decryption operations of the encrypted software package 140 as described below. In an example, the processing circuitry 110 is configured to remove the hardware private key from the encrypted key cache based on a second trigger. In an example, the second trigger is completion of a boot sequence. These examples illustrate a technique to further secure the hardware private key by minimizing exposure of the hardware private key. Here, the boot storage can include secured storage that is restricted after the boot sequence, or otherwise protected from other processes or debugging probes during the operation of the system 105. Thus, generally the boot code is privileged and immutable according to secure boot practices.

The processing circuitry 110 is configured to calculate (e.g., derive, create, etc.) a secret based on the hardware private key and the software public key. In an example, the hardware private key, the software public key, and the secret are related by a Diffie-Helman key agreement protocol. In an example, the Diffie-Helman key agreement protocol is an Elliptic-curve Diffie-Helman key agreement protocol. As noted above, the secret is a point on the elliptic curve that can be determined via a combination of the hardware private key and the software public key.

The processing circuitry 110 is configured to decrypt the encrypted data of the encrypted software package 140 with a technique based on the secret to create data (e.g., unencrypted data). In an example, to decrypt the encrypted data based on the secret, the processing circuitry 110 is configured to create an encryption-decryption key based on the secret and then to decrypt the encrypted data using the encryption-decryption key. In an example, the encryption-decryption key is removed from the memory 115 (e.g., working memory) of the system 105 in response to a second trigger. As noted above, an example of the second trigger can include completion of the boot sequence.

The processing circuitry 110 is configured to use the data after decryption as part of a program execution on the system 105. Thus, software remains cryptographically secure util its operation on the system 105 or the device 125 generally. The above examples focus on the operation of the system 105 and are based on that perspective. The following examples provide a different perspective, that of the software developer 135 producing the encrypted software package 140. The activity below is carried out by computing systems of the software developer, like the processing circuitry 110, memory 115, and storage 120, discussed above but are not illustrated for clarity of the illustration. Accordingly, the following examples will be described as being performed by a computer system of the software developer 135.

The computer system is configured to request (e.g., via an interface to the key management system 133) the hardware public key for a class of computer hardware is requested. This class of computer hardware refers to a classification system in which hardware of the same class shares the same hardware private key. Thus, the hardware need not be the same to be in the same class, or the same type of hardware can be in different classes (e.g., if the classification includes model and year then the same model can be in different classes in different years).

The computer system is configured to generate a secret based on the hardware public key is generated. When ECDH is used, the secret is a point on the elliptic curve common to all parties. However, several other techniques can be used to derive such secrets from the keys.

The computer system is configured to encrypt data based on the secret to create encrypted data. In an example, encrypting the data based on the secret includes creating an encryption-decryption key based on the secret, and encrypting the data using the encryption-decryption key.

The computer system is configured to package the software public key with the encrypted data to create the encrypted software package 140. As above, this software public key is based on the secret.

The computer system is configured to release (e.g., to the device 125 or a manufacturer of the device 125) the encrypted software package 140 (e.g., upon request) for use on the device 125 or the system 105 that is part of the class of computer hardware. Here, the encrypted software package 140 is decrypted by the system 105 using the secret derived from the software public key in the encrypted software package as described above.

In an example, the hardware public key, the software public key, and the secret are related by a Diffie-Helman key agreement protocol. In an example, the Diffie-Helman key agreement protocol is an Elliptic-curve Diffie-Helman key agreement protocol.

In an example, the computer system is configured to receive second data and generate a second secret based on the hardware public key. This example illustrates the ability of the software developer 135 to create different keys, and thus encryption, using the same hardware specific cryptographic key. Thus, the second data can be encrypted using the second secret to create second encrypted data and a second software public key can be packaged with the second encrypted data to create a second software package where the second software public key is based on the second secret. The second software package can then be released for use with on the system 105. In this example, the second software package can be decrypted by the system 105 using the second secret derived from the second software public key.

In an example, the data and the second data are components of a software system. In an example, the second data is a different version of the data. In an example, the software system includes third data that is not encrypted. These examples illustrate different scenarios in which the software developer can use different cryptographic keys, and thus different encryption. The first example illustrates using different keys for different versions of the software. These versions can include geographically different versions, versions differentiated in time, or versions with different capabilities (e.g., improvements). The second example illustrates the ability to protect different parts of the same software system with different keys, including having parts that not encrypted at all. This can allow limited exposure of sensitive data should one key be compromised.

Figure 2:
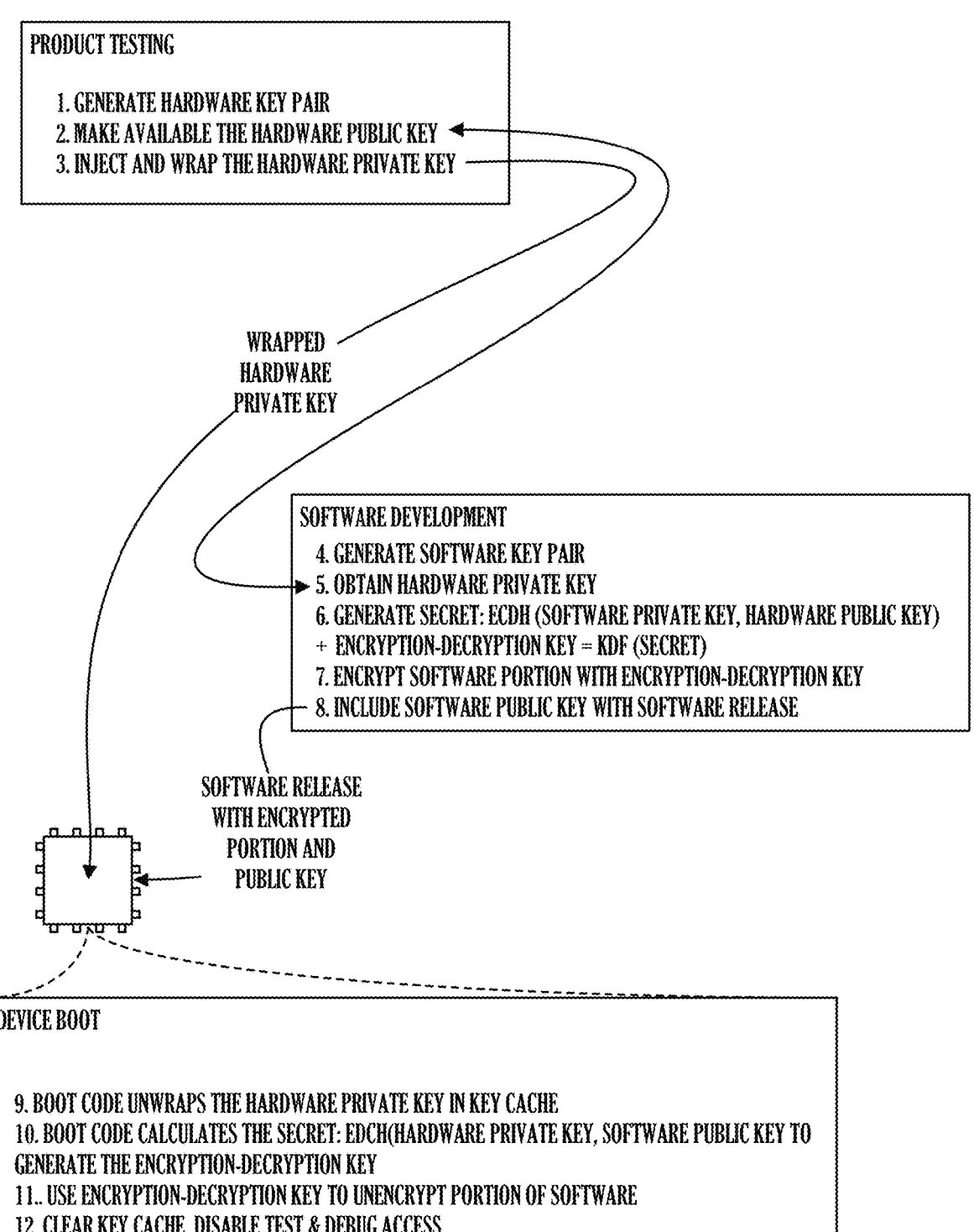
FIG. 2 illustrates an example arrangement of parties to implement a hardware specific cryptographic key, according to an embodiment.

FIG. 2 illustrates an example arrangement of parties to implement a hardware specific cryptographic key, according to an embodiment. During product testing, for a derivative (e.g., class, type, version, etc.) of a hardware circuit product, a new key pair can be generated. Below, this key pair is called the Hardware IP Protection Key Pair. A Product Test Engineering (PTE) team can securely retrieve the Hardware IP Protection Private Key from a Key Management Infrastructure (KMI) and provisions the Hardware IP Protection Private Key to each device. In an example, the provisioning firmware on each device wraps (e.g., encrypts) the Hardware IP Protection Private Key with a device unique memory encryption key and stores the wrapped Hardware IP Protection Private Key in device memory. Thus, there is a single well protected Hardware IP Protection Private Key on each device for a particular test variant of the hardware.

During software development, software developer can use a Key Management Infrastructure to create an elliptic curve cryptography (ECC) key pair (e.g., ECC-256) here called the Software IP Protection Key Pair. The Software IP Protection Private Key can be kept securely in the Key Management Infrastructure from which it was generated. A new Software IP Protection Key Pair can be generated for a variety of reasons, such as for each release version of the software, for each customer, for different components of the same software release, among others.

The software developer can request a copy of the Hardware IP Protection Public Key from the hardware KMI and then use the local KMI to calculate a shared secret using ECDH with the Software IP Protection Private Key and the Hardware IP Protection Public Key as inputs. The software developer can then use this shared secret to derive an IP Encryption Key using, for example, National Institute of Standards and Technology (NIST) approved Key Derivation Function. The software developer can then use the IP Encryption Key to encrypt any content in the software for which protection is an issue. The Software IP Protection Public Key, or Keys, can be included in the software release.

During device boot, the boot code can copy the wrapped Hardware IP Protection Private Key from the device memory to a protected device Key Cache. The boot code can then unwrap the Hardware IP Protection Private Key in the Key Cache. Next, the boot code can use the Software IP Protection Public Key included in the software release to calculate a shared secret using ECDH with the Hardware IP Protection Private Key and the Software IP Protection Public Key as inputs. Once, the shared secret is acquired, the boot code can use the shared secret in the NIST approved Key Derivation Function that was used during software development to derive the same IP Encryption Key that was used for IP encryption. Thus, the boot code uses the IP Encryption Key to decrypt the encrypted content. In an example, once the decryption is complete, the boot code purges the Hardware IP Protection Private Key and the derived IP Encryption Key from the key cache. In an example, when the decryption occurs, the boot code disables any test or debug access to the memory that includes the decrypted content.

Figure 3:
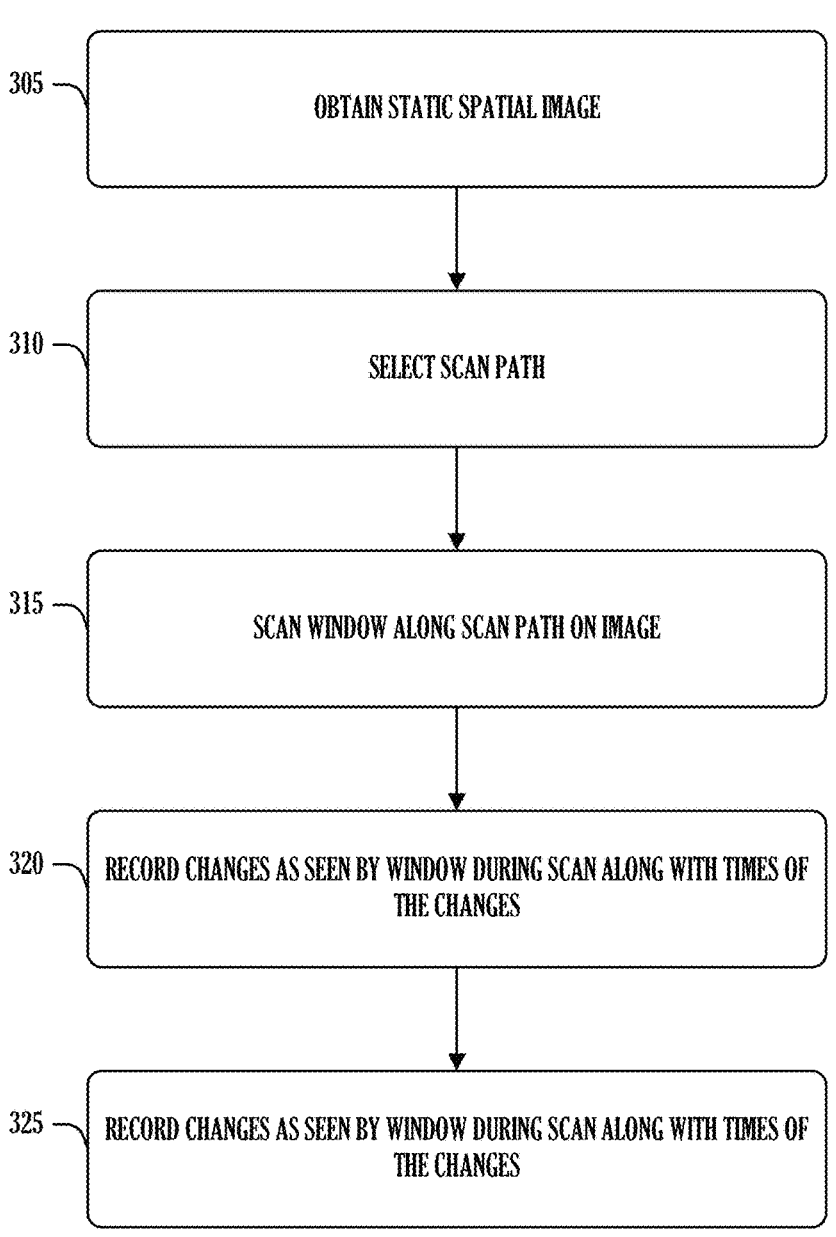
FIG. 3 illustrates a flow diagram of an example of a method for a hardware specific cryptographic key, according to an embodiment.

FIG. 3 illustrates a flow diagram of an example of a method 300 for a hardware specific cryptographic key, according to an embodiment. The operations of the method 300 are implemented in computational hardware, such as that described above or below (e.g., processing circuitry).

At operation 305, a hardware public key for a class of computer hardware is requested.

At operation 310, a secret based on the hardware public key is generated.

At operation 315, data is encrypted based on the secret to create encrypted data. In an example, encrypting the data based on the secret includes creating an encryption-decryption key based on the secret, and encrypting the data using the encryption-decryption key.

At operation 320, a software public key is packaged with the encrypted data to create a software package. Here, the software public key is based on the secret.

At operation 325, the software package is released (e.g., upon request) for use on an instance of computer hardware that is part of the class of computer hardware. Here, the software package is decrypted by the instance of computer hardware using the secret derived from the software public key in the software package. In an example, the instance of the computer hardware includes a hardware private key that is used with the software public key to determine the secret.

In an example, the hardware public key, the software public key, and the secret are related by a Diffie-Helman key agreement protocol. In an example, the Diffie-Helman key agreement protocol is an Elliptic-curve Diffie-Helman key agreement protocol.

In an example, the method 300 includes the additional operations of receiving second data and generating a second secret based on the hardware public key. The second data can be encrypted using the second secret to create second encrypted data. A second software public key can be packaged with the second encrypted data to create a second software package where the second software public key is based on the second secret. The second software package can then be released for use with on the instance of computer hardware. In this example, the second software package can be decrypted by the instance of computer hardware using the second secret derived from the second software public key. In an example, the data and the second data are components of a software system. In an example, the second data is a different version of the data. In an example, the software system includes third data that is not encrypted.

Figure 4:
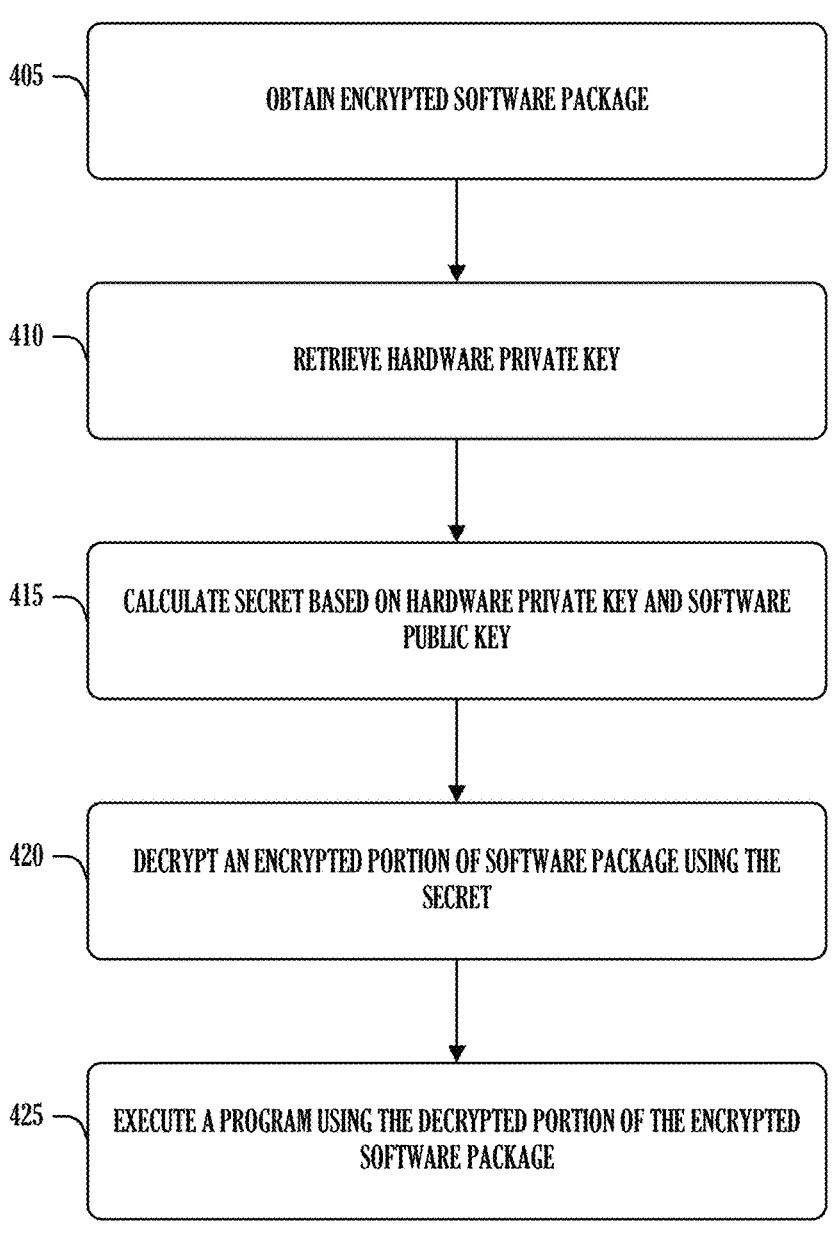
FIG. 4 illustrates a flow diagram of an example of a method for a hardware specific cryptographic key, according to an embodiment.

FIG. 4 illustrates a flow diagram of an example of a method 400 for a hardware specific cryptographic key, according to an embodiment. The operations of the method 400 are implemented in computational hardware, such as that described above or below (e.g., processing circuitry).

At operation 405, an instance of computer hardware can obtain an encrypted software package. Here, the encrypted software package includes encrypted data and a software public key.

At operation 410, instance of computer hardware can retrieve (e.g., based on a trigger) a hardware private key from a secure component of the instance of computer hardware. In an example, the trigger is part of a boot sequence for the instance of computer hardware. In an example, the trigger is part of an installation sequence of the encrypted software package on the instance of computer hardware.

In an example, the secure component is an encrypted key cache. In an example, the operations of the method 400 include decrypting the hardware private key from boot storage as part of a boot sequence for the instance of computer hardware, and loading the hardware private key into the encrypted key cache. In an example, the method 400 includes the operation of removing the hardware private key from the encrypted key cache based on a second trigger. In an example, the second trigger is completion of a boot sequence.

At operation 415, a secret is calculated based on the hardware private key and the software public key. In an example, the hardware private key, the software public key, and the secret are related by a Diffie-Helman key agreement protocol. In an example, the Diffie-Helman key agreement protocol is an Elliptic-curve Diffie-Helman key agreement protocol.

At operation 420, the encrypted data is decrypted with a technique based on the secret to create data (e.g., unencrypted data). In an example, decrypting the data based on the secret includes creating an encryption-decryption key based on the secret, and decrypting the data using the encryption-decryption key. In an example, the encryption-decryption key is removed from working memory of the instance of computer hardware in response to a second trigger.

At operation 425, the data is used as part of a program execution on the instance of computer hardware.

Figure 5:
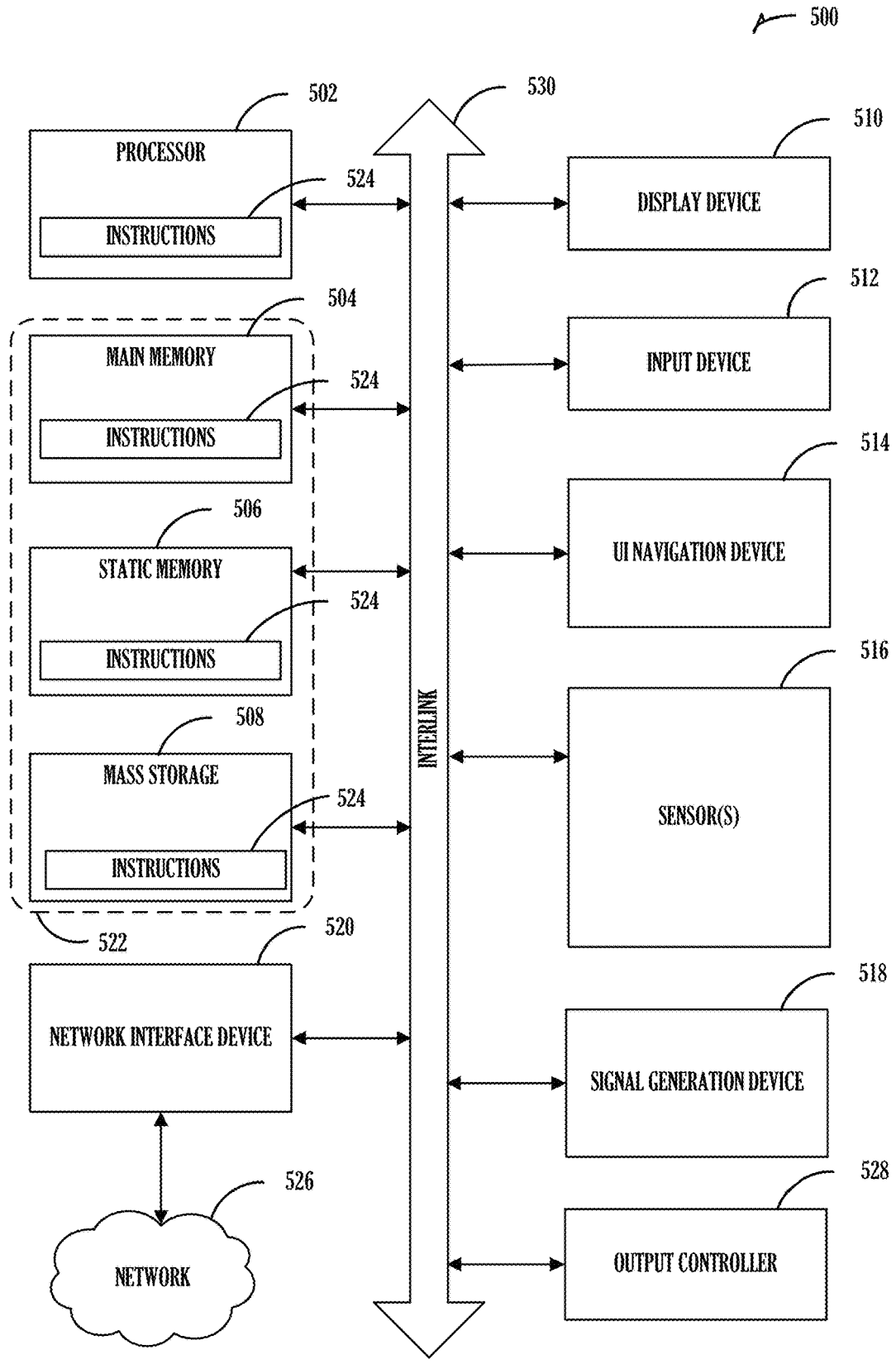
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 may be representative of the instructions 524, such as instructions 524 themselves or a format from which the instructions 524 may be derived. This format from which the instructions 524 may be derived may include source code, encoded instructions (e.g., in compressed or encrypted form), packaged instructions (e.g., split into multiple packages), or the like. The information representative of the instructions 524 in the machine readable medium 522 may be processed by processing circuitry into the instructions to implement any of the operations discussed herein. For example, deriving the instructions 524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 may include assembly, compilation, or interpretation of the information (e.g., by the processing circuitry) to create the instructions 524 from some intermediate or preprocessed format provided by the machine readable medium 522. The information, when provided in multiple parts, may be combined, unpacked, and modified to create the instructions 524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software. A transmission medium is a machine readable medium.

ADDITIONAL NOTES & EXAMPLES

Example 1 is a device for a hardware derived cryptographic key, the device comprising: a secure component configured to restrict access to contents of the secure component; memory including instructions; and processing circuitry that, when in operation, is configured by the instructions to: obtaining an encrypted software package, the encrypted software package including encrypted data and a software public key; retrieving, based on a trigger, a hardware private key from the secure component; calculating a secret based on the hardware private key and the software public key; decrypting, with a technique based on the secret, the encrypted data to create data; and using the data as part of a program execution on an instance of computer hardware in which the device is included.

In Example 2, the subject matter of Example 1, wherein the trigger is part of a boot sequence for the instance of computer hardware.

In Example 3, the subject matter of any of Examples 1-2, wherein the trigger is part of an installation sequence of the encrypted software package on the instance of computer hardware.

In Example 4, the subject matter of any of Examples 1-3, wherein the hardware private key, the software public key, and the secret are related by a Diffie-Helman key agreement protocol.

In Example 5, the subject matter of Example 4, wherein the Diffie-Helman key agreement protocol is an Elliptic-curve Diffie-Helman key agreement protocol.

In Example 6, the subject matter of any of Examples 1-5, wherein to decrypt the encrypted data based on the secret, the processing circuitry is configured to: create an encryption-decryption key based on the secret; and decrypt the encrypted data using the encryption-decryption key.

In Example 7, the subject matter of Example 6, wherein the processing circuitry is configured to remove the encryption-decryption key from working memory of the instance of computer hardware in response to a second trigger.

In Example 8, the subject matter of any of Examples 1-7, wherein the secure component is an encrypted key cache.

In Example 9, the subject matter of Example 8, wherein the processing circuitry is configured to: decrypt the hardware private key from boot storage as part of a boot sequence for the instance of computer hardware; and load the hardware private key into the encrypted key cache.

In Example 10, the subject matter of Example 9, wherein the processing circuitry is configured to remove the hardware private key from the encrypted key cache based on a second trigger.

In Example 11, the subject matter of Example 10 wherein the second trigger is completion of a boot sequence.

Example 12 is a device for a hardware specific cryptographic key, the device comprising: an interface to connect to a network; memory including instructions; and processing circuitry that, when in operation, is configured by the instructions to: request, via the interface, a hardware public key for a class of computer hardware; generate a secret based on the hardware public key; encrypt data based on the secret to create encrypted data; package a software public key with the encrypted data to create a software package, the software public key based on the secret; and release, upon a request, the software package for use on an instance of computer hardware that is part of the class of computer hardware, the software package being decrypted by the instance of computer hardware using the secret derived from the software public key.

In Example 13, the subject matter of Example 12, wherein the instance of the computer hardware includes a hardware private key that is used with the software public key to determine the secret.

In Example 14, the subject matter of any of Examples 12-13, wherein the hardware public key, the software public key, and the secret are related by a Diffie-Helman key agreement protocol.

In Example 15, the subject matter of Example 14, wherein the Diffie-Helman key agreement protocol is an Elliptic-curve Diffie-Helman key agreement protocol.

In Example 16, the subject matter of any of Examples 12-15, wherein, to encrypt the data based on the secret, the processing circuitry is configured to: create an encryption-decryption key based on the secret; and encrypt the data using the encryption-decryption key.

In Example 17, the subject matter of any of Examples 12-16, wherein the processing circuitry is configured to: receive second data; generate a second secret based on the hardware public key; encrypt the second data using the second secret to create second encrypted data; package a second software public key with the second encrypted data to create a second software package, the second software public key based on the second secret; and release, upon a request, the second software package for use with on the instance of computer hardware, the second software package being decrypted by the instance of computer hardware using the second secret derived from the second software public key.

In Example 18, the subject matter of Example 17, wherein the data and the second data are components of a software system.

In Example 19, the subject matter of Example 18, wherein the software system includes third data that is not encrypted.

In Example 20, the subject matter of any of Examples 17-19, wherein the second data is a different version of the data.

Example 21 is a method for a hardware derived cryptographic key, the method comprising: obtaining, by an instance of computer hardware, an encrypted software package, the encrypted software package including encrypted data and a software public key; retrieving, by the instance of computer hardware based on a trigger, a hardware private key from a secure component of the instance of computer hardware; calculating a secret based on the hardware private key and the software public key; decrypting, with a technique based on the secret, the encrypted data to create data; and using the data as part of a program execution on the instance of computer hardware.

In Example 22, the subject matter of Example 21, wherein the trigger is part of a boot sequence for the instance of computer hardware.

In Example 23, the subject matter of any of Examples 21-22, wherein the trigger is part of an installation sequence of the encrypted software package on the instance of computer hardware.

In Example 24, the subject matter of any of Examples 21-23, wherein the hardware private key, the software public key, and the secret are related by a Diffie-Helman key agreement protocol.

In Example 25, the subject matter of Example 24, wherein the Diffie-Helman key agreement protocol is an Elliptic-curve Diffie-Helman key agreement protocol.

In Example 26, the subject matter of any of Examples 21-25, wherein decrypting the encrypted data based on the secret includes: creating an encryption-decryption key based on the secret; and decrypting the encrypted data using the encryption-decryption key.

In Example 27, the subject matter of Example 26, comprising removing the encryption-decryption key from working memory of the instance of computer hardware in response to a second trigger.

In Example 28, the subject matter of any of Examples 21-27, wherein the secure component is an encrypted key cache.

In Example 29, the subject matter of Example 28, comprising: decrypting the hardware private key from boot storage as part of a boot sequence for the instance of computer hardware; and loading the hardware private key into the encrypted key cache.

In Example 30, the subject matter of Example 29, comprising removing the hardware private key from the encrypted key cache based on a second trigger.

In Example 31, the subject matter of Example 30 wherein the second trigger is completion of a boot sequence.

Example 32 is a method for a hardware specific cryptographic key, the method comprising: requesting a hardware public key for a class of computer hardware; generating a secret based on the hardware public key; encrypting data based on the secret to create encrypted data; packaging a software public key with the encrypted data to create a software package, the software public key based on the secret; and releasing, upon a request, the software package for use on an instance of computer hardware that is part of the class of computer hardware, the software package being decrypted by the instance of computer hardware using the secret derived from the software public key.

In Example 33, the subject matter of Example 32, wherein the instance of the computer hardware includes a hardware private key that is used with the software public key to determine the secret.

In Example 34, the subject matter of any of Examples 32-33, wherein the hardware public key, the software public key, and the secret are related by a Diffie-Helman key agreement protocol.

In Example 35, the subject matter of Example 34, wherein the Diffie-Helman key agreement protocol is an Elliptic-curve Diffie-Helman key agreement protocol.

In Example 36, the subject matter of any of Examples 32-35, wherein encrypting the data based on the secret includes: creating an encryption-decryption key based on the secret; and encrypting the data using the encryption-decryption key.

In Example 37, the subject matter of any of Examples 32-36, comprising: receiving second data; generating a second secret based on the hardware public key; encrypting the second data using the second secret to create second encrypted data; packaging a second software public key with the second encrypted data to create a second software package, the second software public key based on the second secret; and releasing, upon a request, the second software package for use with on the instance of computer hardware, the second software package being decrypted by the instance of computer hardware using the second secret derived from the second software public key.

In Example 38, the subject matter of Example 37, wherein the data and the second data are components of a software system.

In Example 39, the subject matter of Example 38, wherein the software system includes third data that is not encrypted.

In Example 40, the subject matter of any of Examples 37-39, wherein the second data is a different version of the data.

Example 41 is a machine readable medium including instructions for a hardware derived cryptographic key, the instructions, when executed by processing circuitry, cause the processing circuitry to perform operations comprising: obtaining, by an instance of computer hardware, an encrypted software package, the encrypted software package including encrypted data and a software public key; retrieving, by the instance of computer hardware based on a trigger, a hardware private key from a secure component of the instance of computer hardware; calculating a secret based on the hardware private key and the software public key; decrypting, with a technique based on the secret, the encrypted data to create data; and using the data as part of a program execution on the instance of computer hardware.

In Example 42, the subject matter of Example 41, wherein the trigger is part of a boot sequence for the instance of computer hardware.

In Example 43, the subject matter of any of Examples 41-42, wherein the trigger is part of an installation sequence of the encrypted software package on the instance of computer hardware.

In Example 44, the subject matter of any of Examples 41-43, wherein the hardware private key, the software public key, and the secret are related by a Diffie-Helman key agreement protocol.

In Example 45, the subject matter of Example 44, wherein the Diffie-Helman key agreement protocol is an Elliptic-curve Diffie-Helman key agreement protocol.

In Example 46, the subject matter of any of Examples 41-45, wherein decrypting the encrypted data based on the secret includes: creating an encryption-decryption key based on the secret; and decrypting the encrypted data using the encryption-decryption key.

In Example 47, the subject matter of Example 46, wherein the operations comprise removing the encryption-decryption key from working memory of the instance of computer hardware in response to a second trigger.

In Example 48, the subject matter of any of Examples 41-47, wherein the secure component is an encrypted key cache.

In Example 49, the subject matter of Example 48, wherein the operations comprise: decrypting the hardware private key from boot storage as part of a boot sequence for the instance of computer hardware; and loading the hardware private key into the encrypted key cache.

In Example 50, the subject matter of Example 49, wherein the operations comprise removing the hardware private key from the encrypted key cache based on a second trigger.

In Example 51, the subject matter of Example 50 wherein the second trigger is completion of a boot sequence.

Example 52 is a machine readable medium including instructions for a hardware specific cryptographic key, the instructions, when executed by processing circuitry, cause the processing circuitry to perform operations comprise: requesting a hardware public key for a class of computer hardware; generating a secret based on the hardware public key; encrypting data based on the secret to create encrypted data; packaging a software public key with the encrypted data to create a software package, the software public key based on the secret; and releasing, upon a request, the software package for use on an instance of computer hardware that is part of the class of computer hardware, the software package being decrypted by the instance of computer hardware using the secret derived from the software public key.

In Example 53, the subject matter of Example 52, wherein the instance of the computer hardware includes a hardware private key that is used with the software public key to determine the secret.

In Example 54, the subject matter of any of Examples 52-53, wherein the hardware public key, the software public key, and the secret are related by a Diffie-Helman key agreement protocol.

In Example 55, the subject matter of Example 54, wherein the Diffie-Helman key agreement protocol is an Elliptic-curve Diffie-Helman key agreement protocol.

In Example 56, the subject matter of any of Examples 52-55, wherein encrypting the data based on the secret includes: creating an encryption-decryption key based on the secret; and encrypting the data using the encryption-decryption key.

In Example 57, the subject matter of any of Examples 52-56, wherein the operations comprise: receiving second data; generating a second secret based on the hardware public key; encrypting the second data using the second secret to create second encrypted data; packaging a second software public key with the second encrypted data to create a second software package, the second software public key based on the second secret; and releasing, upon a request, the second software package for use with on the instance of computer hardware, the second software package being decrypted by the instance of computer hardware using the second secret derived from the second software public key.

In Example 58, the subject matter of Example 57, wherein the data and the second data are components of a software system.

In Example 59, the subject matter of Example 58, wherein the software system includes third data that is not encrypted.

In Example 60, the subject matter of any of Examples 57-59, wherein the second data is a different version of the data.

Example 61 is a system for a hardware derived cryptographic key, the system comprising: means for obtaining, by an instance of computer hardware, an encrypted software package, the encrypted software package including encrypted data and a software public key; means for retrieving, by the instance of computer hardware based on a trigger, a hardware private key from a secure component of the instance of computer hardware; means for calculating a secret based on the hardware private key and the software public key; means for decrypting, with a technique based on the secret, the encrypted data to create data; and means for using the data as part of a program execution on the instance of computer hardware.

In Example 62, the subject matter of Example 61, wherein the trigger is part of a boot sequence for the instance of computer hardware.

In Example 63, the subject matter of any of Examples 61-62, wherein the trigger is part of an installation sequence of the encrypted software package on the instance of computer hardware.

In Example 64, the subject matter of any of Examples 61-63, wherein the hardware private key, the software public key, and the secret are related by a Diffie-Helman key agreement protocol.

In Example 65, the subject matter of Example 64, wherein the Diffie-Helman key agreement protocol is an Elliptic-curve Diffie-Helman key agreement protocol.

In Example 66, the subject matter of any of Examples 61-65, wherein the means for decrypting the encrypted data based on the secret include: means for creating an encryption-decryption key based on the secret; and means for decrypting the encrypted data using the encryption-decryption key.

In Example 67, the subject matter of Example 66, comprising means for removing the encryption-decryption key from working memory of the instance of computer hardware in response to a second trigger.

In Example 68, the subject matter of any of Examples 61-67, wherein the secure component is an encrypted key cache.

In Example 69, the subject matter of Example 68, comprising: means for decrypting the hardware private key from boot storage as part of a boot sequence for the instance of computer hardware; and means for loading the hardware private key into the encrypted key cache.

In Example 70, the subject matter of Example 69, comprising means for removing the hardware private key from the encrypted key cache based on a second trigger.

In Example 71, the subject matter of Example 70 wherein the second trigger is completion of a boot sequence.

Example 72 is a system for a hardware specific cryptographic key, the system comprising: means for requesting a hardware public key for a class of computer hardware; means for generating a secret based on the hardware public key; means for encrypting data based on the secret to create encrypted data; means for packaging a software public key with the encrypted data to create a software package, the software public key based on the secret; and means for releasing, upon a request, the software package for use on an instance of computer hardware that is part of the class of computer hardware, the software package being decrypted by the instance of computer hardware using the secret derived from the software public key.

In Example 73, the subject matter of Example 72, wherein the instance of the computer hardware includes a hardware private key that is used with the software public key to determine the secret.

In Example 74, the subject matter of any of Examples 72-73, wherein the hardware public key, the software public key, and the secret are related by a Diffie-Helman key agreement protocol.

In Example 75, the subject matter of Example 74, wherein the Diffie-Helman key agreement protocol is an Elliptic-curve Diffie-Helman key agreement protocol.

In Example 76, the subject matter of any of Examples 72-75, wherein the means for encrypting the data based on the secret include: means for creating an encryption-decryption key based on the secret; and means for encrypting the data using the encryption-decryption key.

In Example 77, the subject matter of any of Examples 72-76, comprising: means for receiving second data; means for generating a second secret based on the hardware public key; means for encrypting the second data using the second secret to create second encrypted data; means for packaging a second software public key with the second encrypted data to create a second software package, the second software public key based on the second secret; and means for releasing, upon a request, the second software package for use with on the instance of computer hardware, the second software package being decrypted by the instance of computer hardware using the second secret derived from the second software public key.

In Example 78, the subject matter of Example 77, wherein the data and the second data are components of a software system.

In Example 79, the subject matter of Example 78, wherein the software system includes third data that is not encrypted.

In Example 80, the subject matter of any of Examples 77-79, wherein the second data is a different version of the data.

Example 81 is a system for a hardware derived cryptographic key, the system comprising: means for obtaining, by an instance of computer hardware, an encrypted software package, the encrypted software package including encrypted data and a software public key; means for retrieving, by the instance of computer hardware based on a trigger, a hardware private key from a secure component of the instance of computer hardware; means for calculating a secret based on the hardware private key and the software public key; means for decrypting, with a technique based on the secret, the encrypted data to create data; and means for using the data as part of a program execution on the instance of computer hardware.

In Example 82, the subject matter of Example 81, wherein the trigger is part of a boot sequence for the instance of computer hardware.

In Example 83, the subject matter of any of Examples 81-82, wherein the trigger is part of an installation sequence of the encrypted software package on the instance of computer hardware.

In Example 84, the subject matter of any of Examples 81-83, wherein the hardware private key, the software public key, and the secret are related by a Diffie-Helman key agreement protocol.

In Example 85, the subject matter of Example 84, wherein the Diffie-Helman key agreement protocol is an Elliptic-curve Diffie-Helman key agreement protocol.

In Example 86, the subject matter of any of Examples 81-85, wherein the means for decrypting the encrypted data based on the secret include: means for creating an encryption-decryption key based on the secret; and means for decrypting the encrypted data using the encryption-decryption key.

In Example 87, the subject matter of Example 86, comprising means for removing the encryption-decryption key from working memory of the instance of computer hardware in response to a second trigger.

In Example 88, the subject matter of any of Examples 81-87, wherein the secure component is an encrypted key cache.

In Example 89, the subject matter of Example 88, comprising: means for decrypting the hardware private key from boot storage as part of a boot sequence for the instance of computer hardware; and means for loading the hardware private key into the encrypted key cache.

In Example 90, the subject matter of Example 89, comprising means for removing the hardware private key from the encrypted key cache based on a second trigger.

In Example 91, the subject matter of Example 90 wherein the second trigger is completion of a boot sequence.

PNUM Example 92 is at least one machine-readable medium including instructions that, when executed by processing circuitry, cause the processing circuitry to perform operations to implement of any of Examples 1-91.

PNUM Example 93 is an apparatus comprising means to implement of any of Examples 1-91.

PNUM Example 94 is a system to implement of any of Examples 1-91.

PNUM Example 95 is a method to implement of any of Examples 1-91.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A non-transitory machine readable medium including instructions for a hardware specific cryptographic key, the instructions, when executed by processing circuitry, cause the processing circuitry to perform operations comprise:
    requesting a hardware public key for a class of computer hardware;
    generating a secret based on the hardware public key;
    encrypting data based on the secret to create encrypted data;
    packaging a software public key with the encrypted data to create a software package, the software public key based on the secret;
    releasing, upon a request, the software package for use on an instance of computer hardware that is part of the class of computer hardware, the software package being decrypted by the instance of computer hardware using the secret derived from the software public key;
    receiving second data;
    generating a second secret based on the hardware public key;
    encrypting the second data using the second secret to create second encrypted data;
    packaging a second software public key with the second encrypted data to create a second software package, the second software public key based on the second secret; and
    releasing, upon a request, the second software package for use with the instance of computer hardware, the second software package being decrypted by the instance of computer hardware using the second secret derived from the second software public key.

2. The non-transitory machine readable medium of claim 1, wherein the instance of the computer hardware includes a hardware private key that is used with the software public key to determine the secret.

3. The non-transitory machine readable medium of claim 1, wherein the hardware public key, the software public key, and the secret are related by a Diffie-Helman key agreement protocol.

4. The non-transitory machine readable medium of claim 3, wherein the Diffie-Helman key agreement protocol is an Elliptic-curve Diffie-Helman key agreement protocol.

5. The non-transitory machine readable medium of claim 1, wherein encrypting the data based on the secret includes:
    creating an encryption-decryption key based on the secret; and
    encrypting the data using the encryption-decryption key.

6. The non-transitory machine readable medium of claim 1, wherein the data and the second data are components of a software system.

7. The non-transitory machine readable medium of claim 6, wherein the software system includes third data that is not encrypted.

8. The non-transitory machine readable medium of claim 1, wherein the second data is a different version of the data.

9. A device for a hardware specific cryptographic key, the device comprising:
    an interface to connect to a network;
    memory including instructions; and
    processing circuitry that, when in operation, is configured by the instructions to:
        request, via the interface, a hardware public key for a class of computer hardware;
        generate a secret based on the hardware public key;
        encrypt data based on the secret to create encrypted data;
        package a software public key with the encrypted data to create a software package, the software public key based on the secret;
        release, upon a request, the software package for use on an instance of computer hardware that is part of the class of computer hardware, the software package being decrypted by the instance of computer hardware using the secret derived from the software public key;
        receive second data;
        generate a second secret based on the hardware public key;
        encrypt the second data using the second secret to create second encrypted data;
        package a second software public key with the second encrypted data to create a second software package, the second software public key based on the second secret; and
        release, upon a request, the second software package for use with on the instance of computer hardware, the second software package being decrypted by the instance of computer hardware using the second secret derived from the second software public key.

10. The device of claim 9, wherein the instance of the computer hardware includes a hardware private key that is used with the software public key to determine the secret.

11. The device of claim 9, wherein the hardware public key, the software public key, and the secret are related by a Diffie-Helman key agreement protocol.

12. The device of claim 11, wherein the Diffie-Helman key agreement protocol is an Elliptic-curve Diffie-Helman key agreement protocol.

13. The device of claim 9, wherein, to encrypt the data based on the secret, the processing circuitry is configured to:
    create an encryption-decryption key based on the secret; and
    encrypt the data using the encryption-decryption key.

14. The device of claim 9, wherein the data and the second data are components of a software system.

15. The device of claim 14, wherein the software system includes third data that is not encrypted.

16. The device of claim 9, wherein the second data is a different version of the data.

17. A method for a hardware specific cryptographic key, the method comprising:
    requesting a hardware public key for a class of computer hardware;
    generating a secret based on the hardware public key;
    encrypting data based on the secret to create encrypted data;

packaging a software public key with the encrypted data to create a software package, the software public key based on the secret;

releasing, upon a request, the software package for use on an instance of computer hardware that is part of the class of computer hardware, the software package being decrypted by the instance of computer hardware using the secret derived from the software public key;

receiving second data;

generating a second secret based on the hardware public key;

encrypting the second data using the second secret to create second encrypted data;

packaging a second software public key with the second encrypted data to create a second software package, the second software public key based on the second secret; and releasing, upon a request, the second software package for use with on the instance of computer hardware, the second software package being decrypted by the instance of computer hardware using the second secret derived from the second software public key.

18. The method of claim 17, wherein the hardware public key, the software public key, and the secret are related by a Diffie-Helman key agreement protocol.

19. The method of claim 18, wherein the Diffie-Helman key agreement protocol is an Elliptic-curve Diffie-Helman key agreement protocol.

20. The method of claim 17, wherein the data and the second data are components of a software system.

* * * * *